No. 834,265. PATENTED OCT. 30, 1906.
E. W. COOKE.
DEHYDRATING APPARATUS.
APPLICATION FILED JAN. 29, 1904.
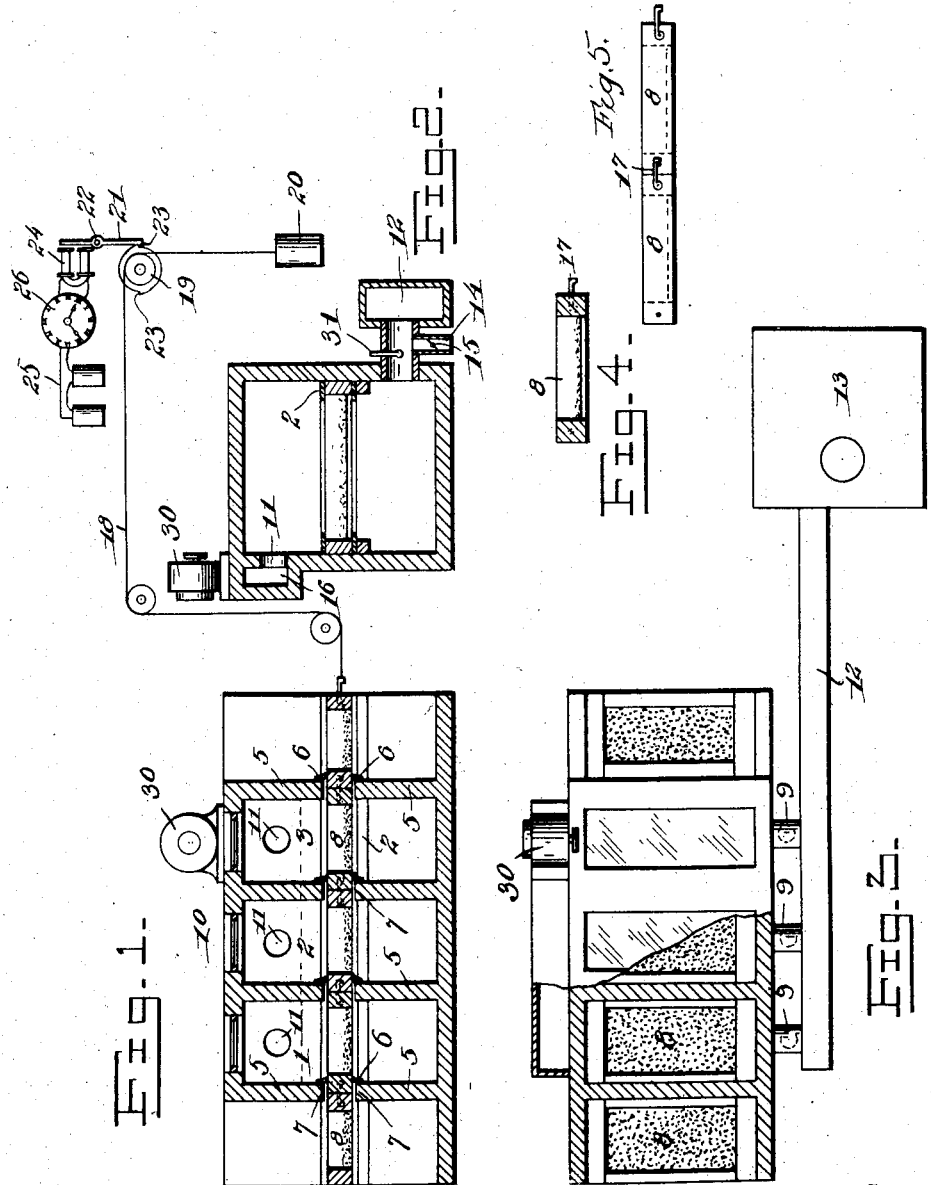
Inventor
Ernest W. Cooke,

UNITED STATES PATENT OFFICE.

ERNEST WILLIAM COOKE, OF NEW YORK, N. Y., ASSIGNOR, BY MESNE ASSIGNMENTS, TO THE COKEL COMPANY, A CORPORATION OF NEW JERSEY.

DEHYDRATING APPARATUS.

No. 834,265.  Specification of Letters Patent.  Patented Oct. 30, 1906.

Application filed January 29, 1904. Serial No. 191,557.

*To all whom it may concern:*

Be it known that I, ERNEST WILLIAM COOKE, a citizen of the United States of America, residing at New York city, in the county of New York and State of New York, have invented certain new and useful Improvements in Dehydrating Apparatus, of which the following is a specification.

My invention relates to dehydrating apparatus, and is more particularly designed for the treatment of food products, both animal and vegetable, whereby the same can be dehydrated in such a way that they can be kept indefinitely in tight packages and then be perfectly restored to their original undehydrated condition by the simple addition of water.

The present apparatus is designed for a particular kind of treatment, which is desirable in some instances and which I will now explain.

In a companion application for patent, Serial No. 191,558, filed the same day as this application, I describe a dehydrating apparatus in which a current of dry air is passed through the dehydrating-chamber from one end to the other in the opposite direction to that in which the trays carrying the material to be treated are fed, the construction being such that the air passes upward through one tray and downward through the next. The entering material is thus first encountered by air which has previously passed through a quantity of the same or other material and which has consequently absorbed a good deal of moisture. As the trays are intermittently fed through the chamber the material comes in contact with portions of the air-current which contain progressively less and less moisture until finally it encounters air of the initial dryness and temperature. In my present application, however, the material is successively subjected to the action of different currents of air the temperature and humidity of which can be independently controlled.

Some substances require a more rapid dehydration at first than others, and in this apparatus the first current of air may be of any desired dryness and the subsequent currents of air may be regulated so as to make the final dehydration gradual. Other substances give better results when subjected to alternately hot and cool air, which can readily be accomplished by this apparatus. In fact, any number of variations in the treatment of different products can be obtained therewith.

My invention comprises, further, automatic means for pulling the trays through the apparatus at predetermined intervals of time.

Other features and advantages of the invention will be apparent from the following detailed description, taken in connection with the drawings, in which—

Figure 1 is a longitudinal vertical section through the apparatus, showing also diagrammatically the automatic apparatus for feeding the trays. Fig. 2 is a transverse section through the apparatus. Fig. 3 is a plan view of the same. Fig. 4 is a longitudinal sectional view of one of the trays. Fig. 5 is a side elevation of a pair of trays, showing the connecting means.

In said figures 10, represents the dehydrating-chamber as a whole, the same being divided into sections 1 2 3, &c., by transverse partitions 5, in which are transverse apertures 7 of substantially the size of the trays 8, on which the material to be dehydrated is placed, preferably in a more or less finely-divided state. The distance between adjacent partitions 5 is equal to an integral multiple of the length of the trays, so that when the trays are stopped the ends of a pair of adjacent trays always come in line with each partition. The edges of the apertures 7 are provided with packing-strips 6, which contact with the ends of the trays, as shown, to make a substantially air-tight joint. The trays which move on guideways 2 may be pushed through the chamber, or they may be provided with means to attach them to each other and be drawn through. As shown, each tray has a pair of hooks 17, adapted to engage pins on the preceding tray, and to the hook of the forwardmost tray is attached one end of a cord 18 or the like, which is wound around a drum 19 and has a weight 20 on its other end. The drum 19 is prevented from rotating by a latch-lever 21, pivoted at 22 and engaging a stop-shoulder 23 on the drum. An electromagnet 24, the circuit 25 of which is controlled by a time mechanism 26, attracts the upper end of said lever 21 at predetermined intervals and releases the drum and weight, the latter thus pulling the trays through the chamber for a distance equal to one tray. The magnet being immediately deënergized again, the lever returns to its original position, either under the influence of gravity or a spring, and is then in position to engage the other stop-shoulder 23. The front tray is then detached, the cord 18 fastened to the next tray, and another tray connected on at the other end. The operation is then repeated.

Each of the sections 1 2 3, &c., (there being as many of them as desired,) has an air-inlet 9 on one side of the path of the trays and an air-outlet 11 on the other side. The air-inlets, as shown, consist of short pieces of piping leading through the side wall of the chamber and communicating with a tube or duct 12, connected with a furnace or air-drier 13. The pipes 9 have lateral branches 14, provided with dampers or valves 15, through which outside air or air which has been artificially cooled by any suitable means can be admitted as desired to independently temper the quality of the air entering each section.

The outlets 11 lead into a duct 16, running along the side of the chamber and communicating at one end with a fan or blower 30, which draws the air through the apparatus. Of course the air may be blown through instead without departing from my invention, and it may equally well pass downwardly through the trays instead of upwardly, as shown, or the air may pass upwardly through one and downwardly through the next. I desire the term "air" to be understood as covering any suitable vaporous gas, as well as atmospheric air.

31 represents a thermometer in the air-inlet and other thermometers, and also hygrometers (not shown) are preferably employed, so that the condition of the entering and leaving currents of air may be readily ascertained.

Various modifications in construction may obviously be made within the scope of my invention, which is set forth in the following claims.

I claim—

1. In a dehydrating apparatus, a chamber composed of a plurality of sections separated by transverse partitions, there being an aperture in each partition extending transversely of said chamber, longitudinal guideways located on the sides of the chamber to register with said apertures and adapted to support and guide carrying-trays for the material to be treated, and air inlet and outlet pipes in each of said sections on opposite sides of said guideways, and means to force air through said pipes.

2. In a dehydrating apparatus, a chamber composed of a plurality of equal sections separated by transverse partitions, there being an aperture in each partition extending transversely of said chamber, longitudinal guideways located on the sides of the chamber to register with said apertures, carrying-trays movably mounted in said guideways, the ends of said trays being of a size to substantially fill said apertures and the length of one or more of said trays being equal to the distance apart of said partitions, means to feed said trays forward the amount of said distance at predetermined intervals and means to pass air through each of said sections from one side of said trays to the other.

3. In a dehydrating apparatus, a chamber composed of a plurality of sections separated by transverse partitions, there being an aperture in each partition extending transversely of said chamber, longitudinal guideways located on the sides of the chamber to register with said apertures, carrying-trays for the material to be treated movably mounted on said guideways the length of one or more of said trays being equal to the distance between adjacent partitions, the ends of said trays being of a size to substantially fill said apertures, flexible strips attached to the partitions at the edges of said apertures and adapted to contact with the ends of said trays to cause each of said sections to become practically a closed chamber when a tray is in position therein, means to convey air into each of said sections and through the material carried by the tray therein, independent means to control the temperature of the air admitted to each section and means to feed said trays forward at predetermined intervals of time a distance equal to the length thereof, whereby the material carried by each tray may be successively subjected to the action of air at various temperatures.

4. In a dehydrating apparatus, a chamber composed of a plurality of sections separated by transverse partitions, there being an aperture in each partition extending transversely of said chamber, longitudinal guideways located on the sides of the chamber to register with said apertures and adapted to support and guide carrying-trays for the material to be treated, a pipe and connections to convey air to each of said sections, independent means to regulate the temperature of the air entering each section, a pipe and connections to convey the air out of each of said sections, and means to intermittently feed the trays along said guideways, the outlet connections being on the other side of the path of the trays from the inlet connections, whereby the air is caused to pass through said material and whereby the material may be subjected successively to the action of air at different temperatures.

5. In a dehydrating apparatus, the combination of a chamber divided into a plurality of sections by transverse partitions, each of said partitions having a transverse aperture, carrying-trays for the material to be treated, the length of one or more of said trays being equal to the distance apart of said partitions and the ends of said trays being of a size to substantially fill said apertures, whereby each of said sections is practically hermetically closed when a tray is in position therein, a pipe and connections to convey air into each of said sections on one side of the tray therein, independent means to regulate the temperature of the air entering each section, and a pipe and connections to convey the air out of each section from the other side of the tray therein, whereby the material in said trays may be subjected to the action of air at various temperatures.

6. In a dehydrating apparatus, the combination of a chamber divided into a plurality of sections by transverse partitions, each of said partitions having a transverse aperture, carrying-trays for the material to be treated, the length of one or more of said trays being equal to the distance apart of said partitions and the ends of said trays being of a size to substantially fill said apertures, whereby each of said sections is practically hermetically closed when a tray is in position therein, guideways in the sides of said chamber for said trays, means to feed said trays forward at predetermined intervals of time a distance equal to the length of one tray, an air-drier, a pipe leading from said drier, inlet connections from said pipe to each of said sections, a valve to admit cold air into each of said inlet connections, an outlet connected to each of said sections on the other side of the path of the trays from said inlet connections, a fan and a pipe leading from said fan to all of said outlet connections, whereby air at varying temperatures can be drawn through said sections and through the material carried by said trays and whereby said material can be successively subjected to the action of air at different temperatures.

7. In a dehydrating apparatus, the combination of a chamber divided into a plurality of sections by transverse partitions, each of said partitions having a transverse aperture, carrying-trays for the material to be treated, each of the length of one or more of said trays being equal to the distance apart of said partitions and the ends of said trays being of a size to substantially fill said apertures, whereby each of said sections is practically hermetically closed when a tray is in position therein, guideways in the sides of said chamber for said trays, hooks to connect each tray to the preceding one, means adapted to be attached to the forwardmost tray to pull said trays forwardly at predetermined intervals of time a distance equal to the length of one tray, a pipe and connections to convey air to each of said sections, independent means to regulate the temperature of the air enterings each section, and a pipe and connections to convey the air out of each of said sections, the outlet connections being on the other side of the path of the trays from the inlet connections, whereby the air is caused to pass through said material and whereby the material may be subjected successively to the action of air at different temperatures.

In testimony whereof I have affixed my signature in presence of two witnesses.

ERNEST WILLIAM COOKE.

Witnesses:
H. HAUPT, Jr.,
JACOB APPELL.